United States Patent
Burr et al.

[11] 3,812,671
[45] May 28, 1974

[54] ROCKET FUEL SUPPLY SYSTEM

[75] Inventors: John W. Burr; Hans D. Fricke; Mathew G. Sobieniak, all of Lewiston, N.Y.

[73] Assignee: Textron, Inc., Providence, R.I.

[22] Filed: Aug. 26, 1971

[21] Appl. No.: 175,276

[52] U.S. Cl.................. 60/39.47, 60/39.48, 60/253
[51] Int. Cl. ............................................. F02c 3/26
[58] Field of Search ......... 60/251, 254, 253, 39.47, 60/39.48; 110/28 R, 28 J, 28 E; 222/195; 302/53

[56] References Cited
UNITED STATES PATENTS
3,693,841   9/1972   Hansen .............................. 222/195

Primary Examiner—Samuel Feinberg
Attorney, Agent, or Firm—Bean & Bean

[57] ABSTRACT

A system for supplying a powdered fuel/oxidizer to rocket engines characterized as including a powdered fuel storage chamber and a system for fluidizing the fuel within the chamber and for forwarding the fuel in a fluidized state from the chamber to the engine. The arrangement permits variable control of fuel feed, as well as restarts of the engine.

In a preferred form of the invention, fluidized fuel is discharged from the chamber through a plurality of outlets arranged adjacent an end of the chamber remote from a fuel follower; the outlets being bounded by additional fluidizing gas admission areas permitting discharge of fluidized fuel through the outlets in a uniform or controllable manner.

4 Claims, 6 Drawing Figures

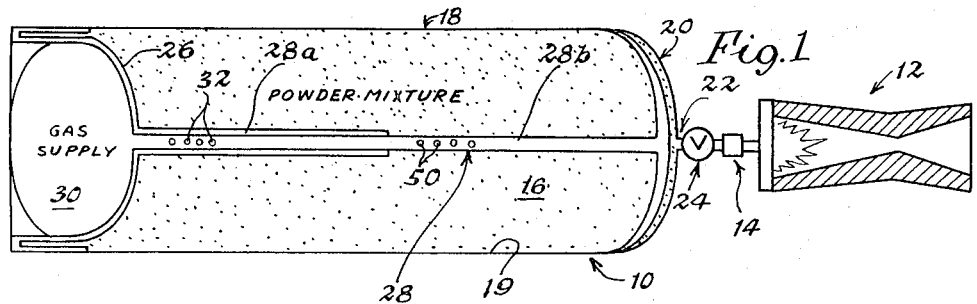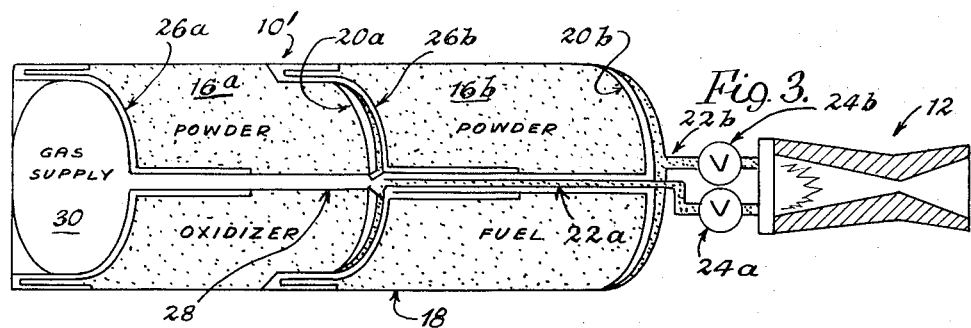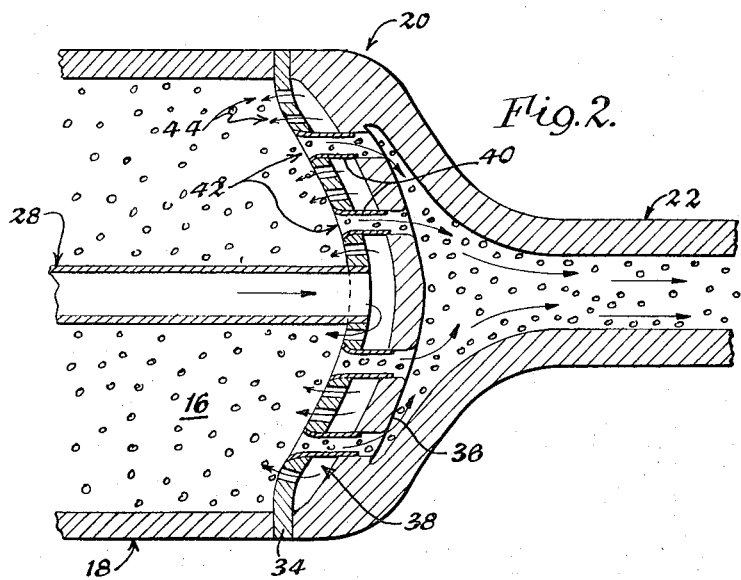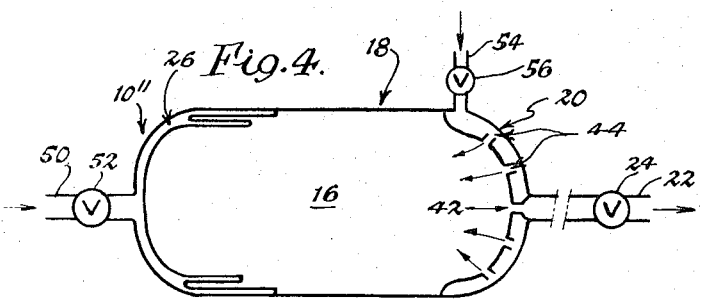

INVENTORS
JOHN W. BURR
HANS D. FRICKE
MATHEW G. SOBIENIAK

BY Bean & Bean
ATTORNEYS 3,812,671

ROCKET FUEL SUPPLY SYSTEM

BACKGROUND OF THE INVENTION

Heretofore, various attempts have been made to devise a restartable "solid" propellant rocket motor having controllable thrust levels.

As by way of example, it has been proposed in U.S. Pat. No. 3,073,113 to arrange a solid propellant charge within a rocket casing and to provide a mechanism for comminuting the solid charge into small particles and direct same into a combustion chamber. The comminuting mechanism includes a comminuting member, which is disposed in contact with an end of the charge immediately adjacent the combustion chamber and supported for rotation by a shaft extending longitudinally through the charge. During operation, the thrust produced by the rocket may be varied by varying the rate of commutation of the charge.

In a more recent development disclosed by U.S. Pat. No. 3,173,252, there is featured a restartable rocket motor fed with fuel stored in comminuted form. The motor includes a fuel discharge control valve and a pressure or follower plate for effecting extrusion of fuel through the valve directly into the combustion chamber. A control is provided for coordinating the operation of the valve and follower plate, such as to vary the rate at which fuel is extruded and thus the thrust output of the rocket motor.

While solid fuel rocket motors of the type mentioned above to provide degrees of controllability, they are not believed to be as readily controlled as a rocket engine employing liquid propellant and are apparently limited to use in rocket constructions wherein the fuel storage chamber is arranged immediately adjacent the combustion chamber.

Moreover, the mechanical drives required in these prior engines increase their cost and weight, while decreasing the storage life and reliability of the otherwise simple solid propellant rocket motor.

SUMMARY OF THE INVENTION

The present invention is directed towards a system for supplying fuel/oxidizer in a fluidized state to a rocket engine, thereby to provide a restartable solid propellant rocket motor having accurately controllable thrust levels.

More particularly, the present invention features the utilization of fluidizing techniques to transport a mixed charge of powdered fuel and oxidizer from a storage tank or charges of powdered fuel and oxidizer from separate tanks to a combustion chamber. A "fluid flow" control valve is arranged in each flow line immediately adjacent to the combustion chamber; such valve providing for accurately controlled flow rates and permitting substantially immediate starting and stopping of the engines regardless of the placement of the charge storage chamber relative to the engine.

The invention also features the provision of a manifold having a plurality of fuel outlets, which are bounded by a plurality of inlets for supplying fluidizing gas to the charge immediately adjacent each outlet. This arrangement provides for uniform and trouble-free expulsion of the powdered charge from the storage chamber.

In an alternative form of the present invention, the fluidizing gas may be in the form of or include a gaseous oxidizer.

While the present invention will be described with particular reference to its use in supplying fuel to a rocket engine, it will be understood that it also possesses utility in combination with other types of reaction engines and gas generators.

DRAWINGS

The nature and mode of operation of the present invention will now be more fully described in the following detailed description, taken with the accompanying drawings wherein:

FIG. 1 is a diagrammatic sectional view illustrating a single fuel tank configuration of the present system in association with a rocket engine;

FIG. 2 is an enlarged diagrammatic view of the distribution and collecting manifold arranged at the discharge end of the tank shown in FIG. 1;

FIG. 3 is a view similar to FIG. 1, but illustrating a duel tank configuration for separate storage of fuel and oxidizer;

FIG. 4 is a diagrammatic view of a modified form of a single tank configuration employing plural sources of fluidizing gas;

DETAILED DESCRIPTION

Figure 5:
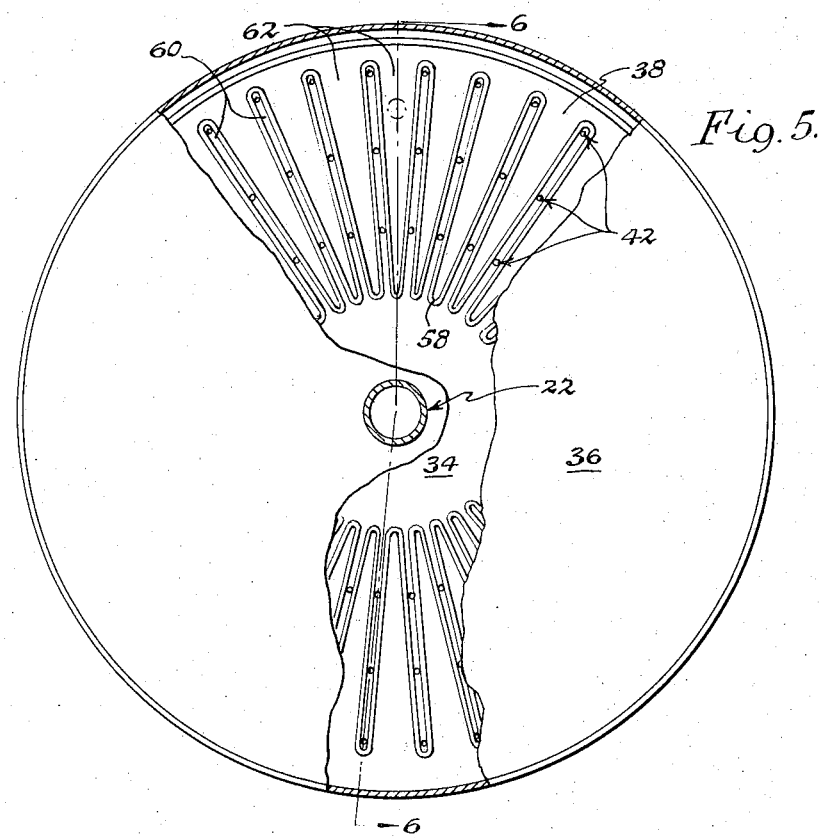
FIG. 5 is an enlarged end view of a modified form of the distribution and collecting manifold.

As by way of example, the system of the present invention is shown in FIG. 1 as comprising a powdered rocket fuel expulsion and control unit 10 arranged in association with the combustion chamber of a rocket or other type of reaction engine or a gas generator 12 having a suitable igniter 14; it being understood that these several elements are arranged within a suitable rocket casing, not shown. In this form of the invention, there is featured a single tank configuration adapted to store a composite or mixed powdered charge of fuel and oxidizer 16. Charge 16 may be in the form of a dry powdered metallic fuel, such as for instance, aluminum, aluminum hydride, zirconium hydride, and a dry powdered oxidizer, such as for instance ammonium pechlorate, ammonium nitrate, hydroxylammonium pechlorate, etc. The components of charge 16 are chosen on the basis of specific impulses and storage life, and are relatively tightly packed in order to maximize use of available space.

Unit 10 generally includes an expulsion tank 18, which is formed with a generally cylindrical shape side wall 19, and closed adjacent one end by a bell shaped distributor and collecting manifold 20. Manifold 20 is connected to an outlet conduit 22 through which charge 16 is delivered to engine 12 under the control of a suitably actuated "fluid flow" control valve 24. The opposite end of tank 18 is closed by a rolling-telescopic type bladder 26, which is arranged concentrically intermediate and fixed to the cylindrical tank wall 19 and an axially extending fluidizing gas flow conduit 28. Thus, in this form of the invention, charge 16 is arranged within a chamber radially bounded by tank side wall 19 and flow conduit 28 and axially bounded by manifold 20 and bladder 26.

By again referring to FIG. 1, it will be seen that opposite ends of flow conduit 28 are supported by and arranged in flow communication with manifold 20 and a suitable source of pressurized gas 30, respectively. Gas source 30 may, for example, be in the form of a cold gas storage unit, a solid gas generator or a liquid gas generator, which may be housed within tank 18 upstream of bladder 26 in the manner illustrated in FIG. 1, or if desired, arranged at a point remote from the expulsion tank and connected to flow conduit 28 by a further conduit, not shown, which may include a gas flow control valve, also not shown.

Bladder 26, which is preferably of the general type disclosed in U.S. Pat. No. 3,494,513 forms no part of the present invention and will not be described in detail. However, to facilitate understanding of the present invention, bladder 26 is generally shown as being accordion pleated in appearance when tank 18 is filled with charge 16. When gas from source 30 is applied to the upstream or the rear surface of the bladder, as for instance through apertures 32, shown by way of example only in FIG. 1, arranged in upstream end portion 28a of flow conduit 28, the bladder is progressively extended. When fully extended, the bladder comprises a lining device, which is arranged to closely hug both the inner surface of tank wall 19 and the outer surface of flow conduit 28, at least adjacent its upstream end portion 28b, and arranged in close proximity to manifold 20. During the extending operation, flow conduit 28 serves as a guide for the bladder.

It will be understood that, while it is preferred to employ a metal bladder of the type referred to above, it is within the scope of the present invention to employ a piston head or like movable charge follower.

Manifold 20 is shown in FIG. 2 as including spaced, generally hemispherically shaped upstream and downstream plate portions 34 and 36, respectively, which cooperate to define a distributing chamber 38 arranged in flow communication with source 30 through flow conduit 28. Flow ducts 40, which are received within aligned openings formed in plate members 34, 36, define outlet openings 42 through which charge 16 is discharged from tank 18 into output conduit 22. Outlet openings 42 are arranged in a pattern permitting substantially uniform discharge through the outlet openings radially of flow conduit 28.

Plate member 34 is additionally apertured to define a plurality of gas inlet openings 44 through which fluidizing gas from chamber 38 is directed into the downstream end of charge 16 at points immediately adjacent the outlet openings 42. Inlet openings 44 are preferably arranged and of sufficient number to insure substantially uniform admission of fluidizing gas into the downstream end of charge 16. When control valve 24 is in a closed condition and a gas under pressure is admitted to flow conduit 28, as from source 30, such gas is simultaneously supplied to the upstream surface of bladder 26 and infused into charge 16 through inlet openings 44 until such time as there is an equalization of gas pressures across the bladder. If flow conduit 22 upstream of control valve 24 is initially empty, it will be immediately filled with charge material, there being some small extending movement of the bladder as determined by the amount of charge material which is required to be discharged from tank 18 in order to fill the discharge conduit. When valve 24 is subsequently opened, with the consequent pressure reduction in conduit 22, the expansion of gas immediately adjacent outlet openings 42 will "fluidize" the charge and provide convective gas for the expulsion of the charge through conduit 22. The discharge of the "fluidize" charge lowers the gas pressure downstream of bladder 26, thereby producing a difference in pressure thereacross. This difference in pressure serves to urge or bias the bladder to extend or move towards plate member 34 as the charge is diminished. The numerous outlet openings and closely associated gas inlet openings insure uniform fluidization and discharge of material from adjacent the downstream end of the charge. In this form of the invention, the rate of discharge may be readily controlled by appropriate adjustments of control valve 24.

If desired, additional fluidizing gas may be introduced into the charge through apertures 50, which are shown by way of example in FIG. 1 as being formed in the flow conduit downstream end portion 28b. Also, in cases where it is desirable to introduce fluidizing gas into the charges in addition to that supplied through inlet openings 44, a piston head may be employed in place of bladder 26; the leakage of gas past the piston head negating the need for providing apertures 50.

In FIG. 3, there is illustrated a modified form of the present expulsion and control unit 10', which accommodates for separate storage of charges of oxidizer 16a and fuel 16b within axially aligned chambers. Of course, the relative sizes of these chambers will depend upon compositions of the oxidizer and fuel employed.

As will be apparent, the oxidizer charge containing chamber is axially bounded by bladder 26a and manifold 20a and the fuel charge containing chamber is axially bounded by bladder 26b and manifold 20b; flow conduit 28 serving to place a single gas source 30 in flow communication serially with bladder 26a, manifold 20a, bladder 26b and manifold 20b. In this construction, oxidizer outlet conduit 22a is arranged to extend concentrically within flow conduit 28 intermediate bladder 26b and manifold 20b, and then to extend through the latter. The flow of "fluidized" oxidizer through outlet conduit 22a and "fluidized" fuel through outlet conduit 22b is controlled by flow control valves 24a and 24b, respectively. The oxidizer and fuel are then combined within rocket engine 12 for instantaneous ignition.

The operation of unit 10' is identical to that described with reference to unit 10, except that a burn control circuit, not shown, will necessarily employ means to couple valves 24a and 24b to insure that the fuel and oxidizer flow rates are maintained in a predetermined ratio, as required to insure proper combustion.

FIG. 4 illustrates another modification of the present expulsion control unit 10", wherein like parts are designated by like numbers. In accordance with this design, the same or separate gas sources, not shown, may be employed to supply gas under pressure to bladder 26 through a flow conduit 50 under the control of valve 52 and to supply fluidizing gas to manifold 20 through flow conduit 54 under the control of valve 56. As in unit 10, the charge outlet conduit 22 is provided with a flow control valve 24 arranged immediately adjacent the reaction engine or gas generator, not shown, to which the charge is to be delivered.

Unlike units 10 and 10', manifold 20 of unit 10" is provided with a single, centrally located charge outlet opening 42; the pluralities of uniformally distributed fluidizing gas inlet openings 44 being relied upon to achieve uniform fluidization of the downstream end or face of charge 16 and subsequent discharge thereof through the outlet opening.

In unit 10", valve 24 may be employed to adjustably control the rate of flow of the charge or to merely open and close conduit 22. When valve 24 only performs the latter function, variable charge flow rates may be accomplished as for example by controlling valve 56 such as to variably reduce the pressure of the fluidizing gas relative to that applied to bladder 26.

A particularly important feature of the construction of unit 10" is that the bladder pressurizing gas source and the fluidizing gas source may be tailored to meet system requirements. As by way of example, the bladder pressurizing gas source may provide a non-corrosive gas permitting prolonged unit storage periods with the bladder in a pressurized condition and the fluidizing gas source may supply a gaseous oxidizer thereby permitting the stored charge to be comprised entirely of fuel and the chamber to be pressurized with oxidizer only when the unit is to be placed in service. When a gaseous oxidizer is employed as the fluidizing medium, it would of course be necessary to provide a suitable ignition device, not shown.

Figure 6:
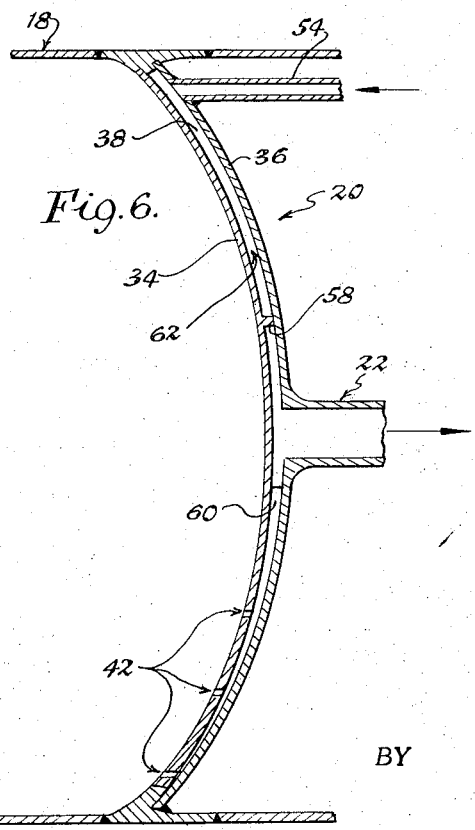
FIG. 6 is a sectional view taken generally along line 6—6 in FIG. 5.

FIGS. 5 and 6 illustrate a modified form of a distribution and collecting manifold shown in FIG. 2, like parts being designated by like numbers. In the illustrated construction, upstream plate member 34 is formed with an undulating, sunburst shaped rib or projection 58, which is disposed in abutting engagement with plate member 36 such as to define a plurality of intersperced or alternately arranged, radially extending fuel feed and fluidized gas channels 60 and 62, respectively. The radially inner ends of fuel feed channels 60 are disposed in flow communication with conduit 22, and the radially outer ends of gas channels 62 are disposed in flow communication with a supply duct 54; the latter in turn being connected to the bladder pressurizing gas source or other suitable source, not shown. In a preferred construction, plate member 34 is formed of a porous material in order to obtain a more uniform distribution of fluidizing gas across the surface of plate 34 and to negate the need for drilling or otherwise forming each individual gas inlet opening. Moreover, it would appear that the flow of fluidizing gas transversely through rib 58 serves to lubricate facing surfaces of the rib and thereby effectively prevent blockage of charge within fuel feed channels 60.

We claim:

1. A system for supplying powdered fuel and powdered oxidizer materials in fluidized state to a point of use, which comprises in combination:

tank means including a pair of generally cylindrical axially aligned chambers for separately storing said powdered fuel and powdered oxidizer materials, each said chamber being axially bounded by manifold means defining a plurality of material outlet openings from said chamber and a plurality of inlet openings arranged immediately adjacent said outlet openings and by movable means arranged remotely from said manifold means and movable theretowards for progressively reducing the storage capacity of said chamber as material is discharged therefrom through said outlet openings;

fluid means for controlling movement of said movable means towards said manifold means and for supplying fluidizing gas to said inlet openings of each said chambers, said fluid means including a source of gas under pressure and gas conduit means, said gas conduit means being arranged to extend concentrically within and axially of said chambers and communicating serially with said movable means and manifold means of a first of said chambers and said movable means and manifold means of a second of said chambers; and material conduit means for separately placing said outlet openings of each of said chambers in flow communication with said point of use and including valve means for separately controlling flow of said materials through said conduit means, said material conduit means associated with said second chamber passing from said tank means to said point of use, said material conduit means associated with said first chamber first passing concentrically relative to said gas conduit means of said second chamber serially through said movable means and manifold means thereof and then passing from said tank means to said point of use, and said valve means being arranged in that portion of said material conduit means passing from said tank means.

2. A system for supplying a powdered charge in a fluidized state to a point of use, which comprises in combination:

a tank means for storing said powdered charge, said tank means including manifold means defining a plurality of outlets from said tank means and a plurality of inlet arranged immediately adjacent said outlets, and movable means arranged remotely from said manifold means and movable theretowards for progressively reducing the charge storage capacity of said tank means as charge is discharged therefrom through said outlet openings, said manifold means including a pair of plate members, one of said plate members being arranged in a facing relationship to said movable means and defining said outlet openings and said inlet openings, said one plate member having portions extending therefrom into engagement with the other of said plate members, whereby said plate members and said portions cooperate to define fluidizing gas channels communicating with said inlet openings and charge feed channels communicating with said outlet openings, and said one plate member and said portions thereof are porous, whereby to define said inlet openings and permit passage of said fluidizing gas from said fluidizing gas channels across said portions into said charge feed channels;

conduit means for placing said charge feed channels in flow communication with said point of use; and fluid means for controlling movement of said movable means towards said manifold means and for supplying fluidizing gas to said fluidizing gas channels.

3. A system for supplying a powdered charge in a fluidized state to a point of use, which comprises in combination:

tank means for storing said powdered charge, said tank means including a cylindrical side wall, manifold means and movable means, said manifold means and said movable means closing opposite ends of said cylindrical side wall, said manifold means including a pair of plate members having facing surface portions thereof arranged in abutting relationship to define a plurality of alternately arranged radially extending fluidizing gas channels and charge feed channels, said fluidizing gas channels being disposed in radially outer communication, said charge feed channels being arranged in radially inner communication, one of said plate members being arranged in a facing relationship to said movable means and defining a concave surface through which extend a plurality of charge outlet openings communicating with said charge feed channels and a plurality of fluidizing gas inlet openings arranged immediately adjacent said outlet openings and communicating with said fluidizing gas channels, and said movable means being movable towards said concave surface for progressively reducing the charge storage capacity of said tank as charge is discharged therefrom through said outlet openings;

conduit means extending through the other of said plate members for placing said charge feed channels in flow communication with said point of use; and fluid means for controlling movement of said movable means towards said manifold means and for supplying fluidizing gas to said fluidizing gas channels.

4. A system for supplying a powdered charge in a fluidized state to a point of use, which comprises in combination;

tank means including a generally cylindrical chamber for storing said powdered charge, said chamber being axially bounded by manifold means and movable means, said manifold means defining a concave surface, through which extend a plurality of charge outlet openings from said chamber and a plurality of inlet openings for introducing charge fluidizing gas into said chamber immediately adjacent said outlet openings, said outlet openings being arranged in a pattern permitting substantially uniform discharge therethrough, and said movable means being movable towards the concave surface for progressively reducing the storage capacity of said chamber as said charge is discharged therefrom through said outlet openings;

fluid means for controlling movement of said movable means towards said manifold means and for supplying fluidizing gas to said manifold means for distribution to said inlet openings, said fluid means including a source of gas under pressure and a gas conduit means, said gas conduit means being arranged to extend concentrically within and axially of said chamber for placing said source in communication serially with said movable means and said manifold means, said conduit means additionally functioning to guide said movable means during movement thereof towards said manifold means; and charge conduit means for placing said outlet openings in flow communication with said point of use.

* * * * *